United States Patent [19]

Heinz et al.

[11] Patent Number: 5,128,400
[45] Date of Patent: Jul. 7, 1992

[54] POLYAMIDE MOLDING COMPOUNDS CONTAINING BISPHENOLS OF HIGH GLASS TEMPERATURE

[75] Inventors: Hans-Detlef Heinz, Krefeld; Aziz E. Sayed, Leverkusen; Ralf Dujardin; Rolf Dhein, both of Krefeld, all of Fed. Rep. of Germany

[73] Assignee: Bayer Aktiengesellschaft, Leverkusen-Bayerwerk, Fed. Rep. of Germany

[21] Appl. No.: 594,724

[22] Filed: Oct. 9, 1990

[30] Foreign Application Priority Data

Oct. 18, 1989 [DE] Fed. Rep. of Germany ........ 3934711

[51] Int. Cl.⁵ .............................................. C08K 5/13
[52] U.S. Cl. ................................................. 524/326
[58] Field of Search ..................................... 524/326

[56] References Cited

FOREIGN PATENT DOCUMENTS

| | | | |
|---|---|---|---|
| 568547 | 1/1959 | Canada | 524/326 |
| 569379 | 1/1959 | Canada | 524/326 |
| 575807 | 5/1959 | Canada | 524/326 |
| 0240887 | 10/1987 | European Pat. Off. | |
| 007176 | 2/1971 | Japan | 524/326 |
| 932066 | 7/1963 | United Kingdom | 524/326 |

*Primary Examiner*—Kriellion S. Morgan
*Attorney, Agent, or Firm*—Connolly & Hutz

[57] ABSTRACT

The invention relates to thermoplastic molding compounds based on polyamides and bisphenols having glass temperatures equal to or above those of the polyamides used, the bisphenols corresponding to the following formula

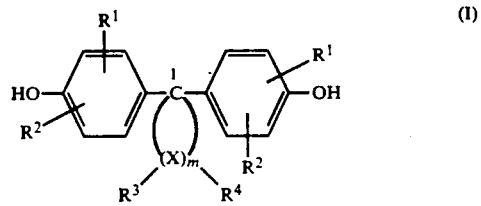

(I)

The invention also relates to a process for their production and to their use for the production of moldings, films, fibers and other articles.

13 Claims, No Drawings

POLYAMIDE MOLDING COMPOUNDS CONTAINING BISPHENOLS OF HIGH GLASS TEMPERATURE

This invention relates to thermoplastic molding compounds based on polyamides and bisphenols having glass temperatures equal to or above those of the polyamides used, the bisphenols corresponding to the following formula

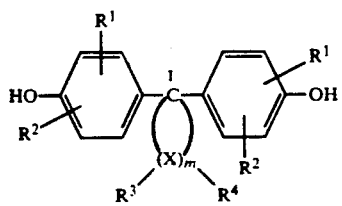

The present invention also relates to a process for their production and to their use for moldings, films, fibers and other articles.

For many years, polyamides have been a proven class of polymers for numerous practical applications. They are produced by various processes, may be synthesized from very different polyamide-forming structural elements and, depending on the particular application, may be processed on their own or even in combination with processing aids, polymeric blending partners or even mineral reinforcing materials (for example fillers or glass fibers) to form materials having specially adapted combinations of properties. Thus, polyamides are industrially used in large quantities for the production of fibers, plastic moldings and films and also, for example, as hotmelt adhesives and auxiliaries for numerous applications.

By virtue of the reduced cohesion energy between the molecule segments in the amorphous region, the addition of low molecular weight organic compounds to partly crystalline polymers generally leads to materials which flow more freely. At the same time, however, the glass temperature (Tg) is also displaced to lower temperatures (U. T. Kreibich and R. Schmid in "Polymere Werkstoffe (Polymeric Materials)", Vol. 1, page 312, Georg Thieme Verlag 1985). The practical consequence of this is that certain mechanical properties, for example strength values (flexural strength, tear strength) and—generally—heat resistance levels are reduced.

It is known that certain bisphenols distinctly reduce the water absorption of polyamides and, for example, also improve their strength values (EP-A 240 887 and DE-OS 3 610 595).

However, the bisphenols in question are generally bisphenols of which the glass temperatures are lower than those of the polyamides (typically of the order of 45° to 60° C.). Although they promote increased strength and rigidity in the freshly molded state, these advantageous property improvements are not maintained in the conditioned state. Accordingly, it would be desirable further to improve the strength and rigidity and also the flow and/or heat resistance of these already very valuable polyamide compounds, particularly in the conditioned state.

Surprisingly and unforeseeably, it has now been found that polyamide molding compounds based on bisphenols having higher glass temperatures than the polyamides show improved strength and rigidity (particularly in the conditioned state) by comparison with polyamide molding compounds based on bisphenols having lower $T_g$ values, in addition to which heat resistance or flow or both together may be increased. In addition, they generally show an increased crystallization rate.

Accordingly, the present invention relates to polyamide molding compounds with addition of bisphenols, characterized in that they contain 1) 70 to 99.9% by weight, preferably 80 to 98% by weight and more preferably 85 to 95% by weight typical polyamides, particularly polyamide 6 and polyamide 66 and 6/66 copolyamides, 2) 0.1 to 30% by weight, preferably 2 to 20% by weight and more preferably 5 to 15% by weight bisphenols corresponding to general formula (I) which have a higher glass temperature ($T_g$) than the particular PA 1)

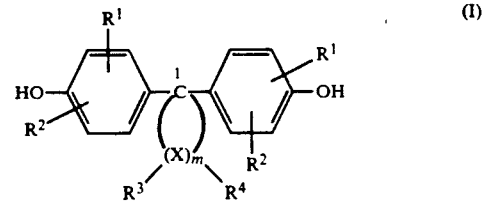

in which $R^1$ and $R^2$ independently of one another represent hydrogen (particularly preferred), halogen, preferably chlorine or bromine, $C_{1-8}$ alkyl, $C_{5-6}$ cycloalkyl, $C_{6-10}$ aryl, preferably phenyl, and $C_{7-12}$ aralkyl, preferably phenyl-$C_{1-4}$-alkyl, more especially benzyl, m is an integer of 4 to 7, preferably 4 or 5, $R^3$ and $R^4$ may be individually selected for each X and, independently of one another, represent hydrogen or $C_{1-6}$ alkyl and X is carbon, with the proviso that, at at least one atom X, both $R^3$ and $R^4$ are alkyl, and optionally, in addition to 1) and 2), 3) up to 150% by weight, for example 0.001 to 150% by weight and preferably 0.2 to 100% by weight, based on the total weight of 1) and 2), of typical additives.

The present invention also relates to a process for their production and to their use for the production of moldings, films, fibers and other articles, for example by injection molding, extrusion and other processes.

The bisphenols corresponding to formula I, their production and their use, optionally in combination with other bisphenols, for the production of homopolycarbonates and copolycarbonates is the subject of German patent application P 38 32 396.6 (Le A 26 344).

In the bisphenols corresponding to formula I, $R^3$ and $R^4$ are both alkyl at 1 to 2 atoms X, but preferably at only 1 atom X. The preferred alkyl radical is methyl; the X atoms in the α-position to the diphenyl-substituted C atom (C-1) are preferably not dialkyl-substituted, whereas the X atoms in the β-position to C-1 are preferably dialkyl-substituted.

Particular preference is attributed in this regard to dihydroxydiphenyl cycloalkanes containing 5 and 6 ring C atoms in the cycloaliphatic radical (m=4 or 5) in formula I, such as for example diphenols corresponding to the following formulae:

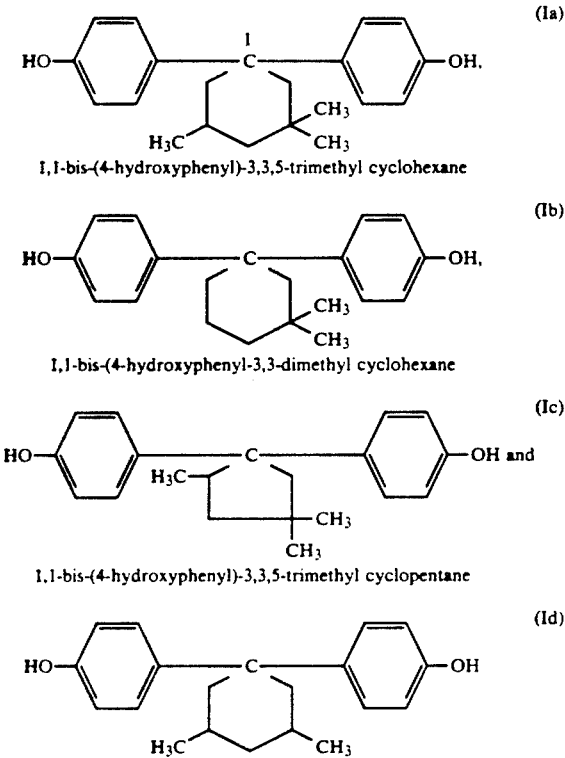

1,1-bis-(4-hydroxyphenyl)-3,5-dimethyl cyclohexane, 1,1-bis-(4-hydroxyphenyl)-3,3,5-trimethyl cyclohexane (formula Ia) being particularly preferred.

The bisphenols used in accordance with the invention are preferably used in quantities of 2 to 20% by weight and more preferably in quantities of 5 to 15% by weight, based on the mixture of 1) and 2).

Suitable polyamides are, for example, PA 6, 66, 610, 11, 12, 1010, 1012, 1212, 69 and 6/66 copolyamides of the type described in the prior art. Typically, they are partly crystalline and have glass temperatures in the range from 50° to 60° C. or lower.

Particularly preferred polyamides are PA-6 and PA-6,6, more especially with relative viscosities (as measured on a 1% solution in m-kresol at 25° C.) of from 2.5 to 5.5 and preferably from 2.7 to 4.5.

Suitable additives 3) include, for example, reinforcing materials and fillers (glass fibers, mineral fillers, glass beads, etc.), polymeric blending partners, preferably those known as impact modifiers, for example based on dienes, olefins, acrylates and silicones, including for example copolymers, graft polymers and multishell polymers; antioxidants, UV stabilizers, pigments, dyes, typical processing aids (for example mold release agents), plasticizers, nucleating agents, flameproofing agents, typical bisphenols, alkylphenol/formaldehyde novolaks, etc., as described in the prior art, either individually or in admixture.

The bisphenol component (I) may be introduced together with the polyamide component into the feed hopper of the extruder or may be added to the compounds to be extruded at a later stage during the extrusion process. The polyamide compounds according to the invention may also be produced in several individual mixing steps.

The mixtures according to the invention may be produced in typical known mixing units. Twin-screw extruders are preferably used.

The polyamides according to the invention modified with bisphenols (having higher $T_g$ values than the polyamides) show distinctly increased flow, rigidity and strength compared with pure PA, even in the conditioned state, and a reduced water absorption and crystallization rate. Compared with polyamides modified with bisphenols having lower $T_g$ values than the polyamide, they generally show increased strength and an increased crystallization rate. In addition, either flow or heat resistance or, particularly unexpectedly, both are increased. In addition, they are surprisingly distinguished by distinctly higher strength and rigidity in the conditioned state.

The new molding compounds are particularly suitable for the production of moldings by injection molding, particularly for complicated moldings and moldings of large surface area which otherwise can only be produced, if at all, with surface defects using processing machines of considerable technical complexity. They are also suitable for the production of fibers and films.

The present invention also relates to the moldings, films, fibers and other articles obtained from the molding compounds according to the invention.

The products are particularly suitable for use in the automotive field (fenders, spoilers, bodywork parts, hubcaps, etc.) and in the electrical field.

The following Examples, with their typical starting materials used in typical quantities, even for the components mentioned in the specification, are intended to illustrate the invention without limiting it in any way.

EXAMPLES $\eta_{rel}$ Values were determined on 1% solutions in m-kresol at 25° C. Percentages are by weight. Thermal data were determined by DSC.

EXAMPLE 1 AND COMPARISON EXAMPLES 1 AND 2

The glass temperatures of the bisphenols mentioned were measured by first melting the bisphenols and then converting them into the glass-like state by cooling with liquid nitrogen. The glass temperature may then be determined from the DSC curve.

The data for a bisphenol to be used in accordance with the invention and two bisphenols to be used in accordance with the teaching of DE-OS 3 610 595 are shown in Table 1.

TABLE 1

| Example | Bisphenol | $T_g$ [°C.] |
|---------|-----------|-------------|
| 1       | I         | 75.4        |
| Comp. 1 | II        | 37.0        |

TABLE 1-continued

| Example | Bisphenol | $T_g$ [°C.] |
|---|---|---|
| Comp. 2 | III | 48.7 |

Structures:
- I: HO—C6H4—(3,3,5-trimethylcyclohexane-1,1-diyl)—C6H4—OH
- II: HO—C6H4—C(CH3)2—C6H4—OH
- III: HO—C6H4—SO2—C6H4—OH

EXAMPLE 2 AND COMPARISON EXAMPLE 3

A 30% glass-fiber-reinforced PA 66 ($\eta_{rel} \approx 2.9$) were compounded with 7% bisphenol I and 7% bisphenol II (in a ZSK 53 extruder) and, after working up in the usual way, were processed to test specimens. The mechanical and thermal properties of these molding compounds are shown in Table 2.

EXAMPLE 3 AND COMPARISON EXAMPLE 4

A 30% glass-fiber-reinforced PA 6 ($\eta_{rel} \approx 2.9$), which contained 5% of a core-shell elastomer with crosslinked polybutadiene as the core and polymethyl methacrylate as the shell, was modified in the same way (see Table 2).

EXAMPLE 4 AND COMPARISON EXAMPLE 5

A 30% mineral-filled PA 6 ($\eta_{rel} \approx 2.9$) was modified in the same way (see Table 2).

The glass temperatures of PA 6 and 66 in the dry state are approximately 50° C. (J. Brandrup, E. H. Immergut; Polymer Handbook, 2nd Ed., John Wiley & Sons, New York 1975).

TABLE 2

| Example | Bisphenol | Flow length[1] [cm] | HDT-A [°C.] | $T_K$[2] [°C.] | $\sigma_R$[3] [MPa] | $\sigma_{3.5}$[4] [MPa] | $\sigma_B$[4] [MPa] | $E_B$[4] [MPa] |
|---|---|---|---|---|---|---|---|---|
| 2 | I | 83 (290° C.; 80 bar) | — | 229 | 117 | 256 | 267 | — |
| Comp. 3 | II | 79 (290° C.; 80 bar) | — | 227 | 172 | 252 | 267 | — |
| 3 | I | — | 190 | 186 | 168 | 235 | 253 | 8100 |
| Comp. 4 | II | — | 188 | 185 | 162 | 224 | 242 | 8000 |
| 4 | I | 49 (270° C.; 80 bar) | 61 | 185 | 88 | 135 | 144 | 4800 |
| Comp. 5 | II | 48 (270° C.; 80 bar) | 57 | 184 | 81 | 117 | 125 | 4300 |

[1]For definition, see DE-OS 3 612 159/EP A 240 887; higher values signify better flow
[2]Determined by DSC (dynamic crystallization); cooling rate: 40 K. min$^{-1}$
[3]Determined by tensile testing
[4]Determined by flexural testing

We claim:

1. Thermoplastic polyamide molding compositions modified with bisphenols which comprise
   A) 70 to 99.9% by weight polyamide and
   B) 0.1 to 30% by weight bisphenols corresponding to formula (I) which have a higher glass temperature ($T_g$) than polyamide A)

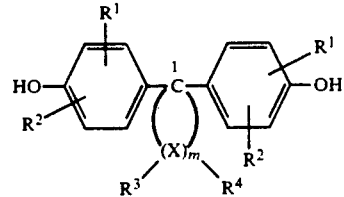

(I)

in which
R$^1$ and R$^2$ independently of one another represent hydrogen, halogen, C$_{1-8}$ alkyl, C$_{5-6}$ cycloalkyl, C$_{6-10}$ aryl, and C$_{7-12}$ aralkyl,
m is an integer of 4 to 7,
R$^3$ and R$^4$ are individually selected for each X and, independently of one another, represent hydrogen or C$_{1-6}$ alkyl and
X is carbon,
with the proviso that, on at least one atom X, both R$^3$ and R$^4$ are alkyl.

2. Polyamide molding compositions as claimed in claim 1 wherein the bisphenols B) correspond to formulae (Ia), (Ib) or (Ic)

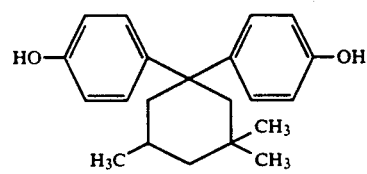

(Ia)

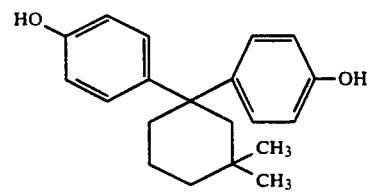

(Ib)

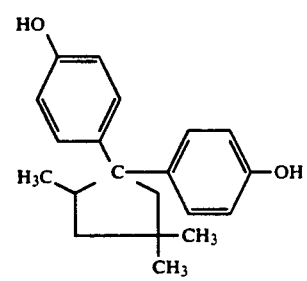

(Ic)

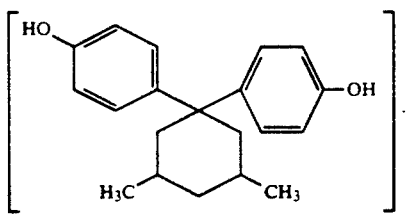
(Id)

3. Polyamide molding compositions as claimed in claim 1 wherein the bisphenol B) is 1,1-bis-(4-hydroxyphenyl)-3, 3,5-trimethyl cyclohexane.

4. Polyamide molding compositions as claimed in claim 1 wherein polyamide A) is polyamide 6, polyamide 66 or copolyamides based on polyamide 6 and polyamide 66.

5. Polyamide molding compositions as claimed in claim 1 wherein the amount of A) is 80 to 88% by weight and the amount of B) is 2 to 80% by weight.

6. Polyamide molding compositions as claimed in claim 1 wherein the amount of A) is 85 to 95% by weight and the amount of B) is 15 to 5% by weight.

7. Polyamide molding compositions as claimed in claim 1 wherein for the bisphenol for formula (I), $R_1$ and $R_2$ are independently hydrogen.

8. Polyamide molding composition as claimed in claim 1 wherein for the bisphenol of formula (I), m is 4 or 5.

9. Polyamide molding composition as claimed in claim 1 wherein for the bisphenol of formula (I), $R_3$ $R_4$ are independently methyl.

10. A process for the production of the molding compositions claimed in claim 1 which comprises melt mixing A) with B) in an extruder or kneader in one or more steps.

11. Molded articles which contain the polyamide molding composition claimed in claim 1.

12. Molded articles according to claim 11 in the form of a fiber.

13. A method of producing the molded article claimed in claim 11 which comprises shaping the polyamide molding composition.

* * * * *